United States Patent
Franke et al.

(10) Patent No.: US 7,378,857 B2
(45) Date of Patent: May 27, 2008

(54) METHODS AND APPARATUSES FOR DETECTING THE LEVEL OF A LIQUID IN A CONTAINER

(75) Inventors: Michael Franke, Darmstadt (DE); Frank Wohlrabe, Kelkheim (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 10/559,006

(22) PCT Filed: Apr. 22, 2004

(86) PCT No.: PCT/EP2004/004240

§ 371 (c)(1),
(2), (4) Date: Nov. 29, 2005

(87) PCT Pub. No.: WO2004/106866

PCT Pub. Date: Dec. 9, 2004

(65) Prior Publication Data

US 2006/0152230 A1    Jul. 13, 2006

(30) Foreign Application Priority Data

May 31, 2003   (DE) ............... 103 24 731

(51) Int. Cl.
G01F 23/26    (2006.01)
G01F 23/00    (2006.01)
G01R 27/26    (2006.01)

(52) U.S. Cl. ............ 324/663; 324/661; 324/664; 73/304 C; 73/304 R; 73/290 R

(58) Field of Classification Search ........ 324/661, 324/629; 73/304 R
See application file for complete search history.

(56) References Cited

U.S. PATENT DOCUMENTS

| | | | | |
|---|---|---|---|---|
| 3,443,438 A | * | 5/1969 | Hasler et al. | 73/304 R |
| 4,345,167 A | * | 8/1982 | Calvin | 327/517 |
| 4,412,450 A | | 11/1983 | Franz et al. | |
| 4,853,718 A | | 8/1989 | elHatem et al. | |
| 5,017,909 A | * | 5/1991 | Goekler | 340/620 |
| 6,362,632 B1 | | 3/2002 | Livingston | |
| 6,443,006 B1 | * | 9/2002 | Degrave | 73/304 C |
| 6,457,335 B1 | | 10/2002 | Fleissner | |
| 2002/0116999 A1 | * | 8/2002 | Heger | 73/304 C |

FOREIGN PATENT DOCUMENTS

| | | |
|---|---|---|
| DE | 28 09 340 | 9/1978 |
| DE | 31 27 637 | 4/1984 |
| DE | 33 22 825 | 1/1985 |
| DE | 2 605 731 | 4/1988 |
| DE | 41 26 091 | 2/1991 |
| DE | 196 13 813 | 6/1999 |
| WO | WO00/43735 | 7/2000 |

* cited by examiner

Primary Examiner—Andrew H. Hirshfeld
Assistant Examiner—John Zhu
(74) Attorney, Agent, or Firm—Fish & Richardson P.C.

(57) ABSTRACT

A method for detecting the level of a liquid in a container. The method includes applying a predetermined voltage to a level measuring electrode, disposed within the container, for a predetermined first period of time; then, discontinuing the application of the voltage and waiting a predetermined second period of time; and then measuring an electrode voltage at the level measuring electrode.

20 Claims, 1 Drawing Sheet

METHODS AND APPARATUSES FOR DETECTING THE LEVEL OF A LIQUID IN A CONTAINER

TECHNICAL FIELD

This disclosure relates to methods and apparatuses for detecting the level of a liquid in a container.

BACKGROUND

Liquid level detection devices are known in the art. For example, U.S. Pat. No. 5,775,164 discloses a device for detecting the level of a liquid in a container. This particular device comprises two electrodes that are arranged in the container and an electronic circuit that is connected to the electrodes. In order to prevent the measuring voltages from electrolyzing the liquid, an a.c. voltage is only generated between the electrodes during brief measuring phases in order to measure the electric resistance between the electrodes.

SUMMARY

According to one aspect, a method for detecting the level of a liquid in a container includes applying a predetermined voltage to a level measuring electrode, disposed within the container, for a predetermined first period of time; then, discontinuing the application of the voltage and waiting a predetermined second period of time; and then measuring an electrode voltage at the level measuring electrode.

The method also provides the advantage that the level measurement causes reduced (e.g., substantially no) electrolyzing of the liquid, the level of which can be measured, because the measuring voltage used for the measurement may consist of a sufficiently short voltage pulse.

In order to continuously monitor the level of a liquid in a container, the level measurement naturally can be repeated periodically. Therefore, in some embodiments, the steps of applying the predetermined voltage, discontinuing the application of the voltage, and measuring the electrode voltage are repeated after a predetermined third period has elapsed after measuring the electrode voltage. After measuring the electrode voltage, the level measuring electrode can be connected to an electric potential, for example, the ground potential, for a predetermined fourth period. By connecting the level measuring electrode to the electric potential the liquid is prevented from being charged over time, and therefore unreliable measurements can be prevented.

A suitable circuit arrangement for implementing the method can be provided in the form of a measuring circuit that, in addition to a ground terminal, requires only one terminal for the level measurement, namely because the individual steps are carried out successively. This can be particularly advantageous in instances in which such a measuring circuit is implemented in a microcontroller or an application-specific integrated circuit (ASIC) because the number of terminals on a microcontroller or ASIC represents a significant cost factor. However, it is advantageous to be able to alternately use this terminal as an output and an input.

The details of one or more embodiments of the invention are set forth in the accompanying drawing and the description below. Other features and advantages of the invention will be apparent from the description and drawing, and from the claims.

DETAILED DESCRIPTION

Figure 1:
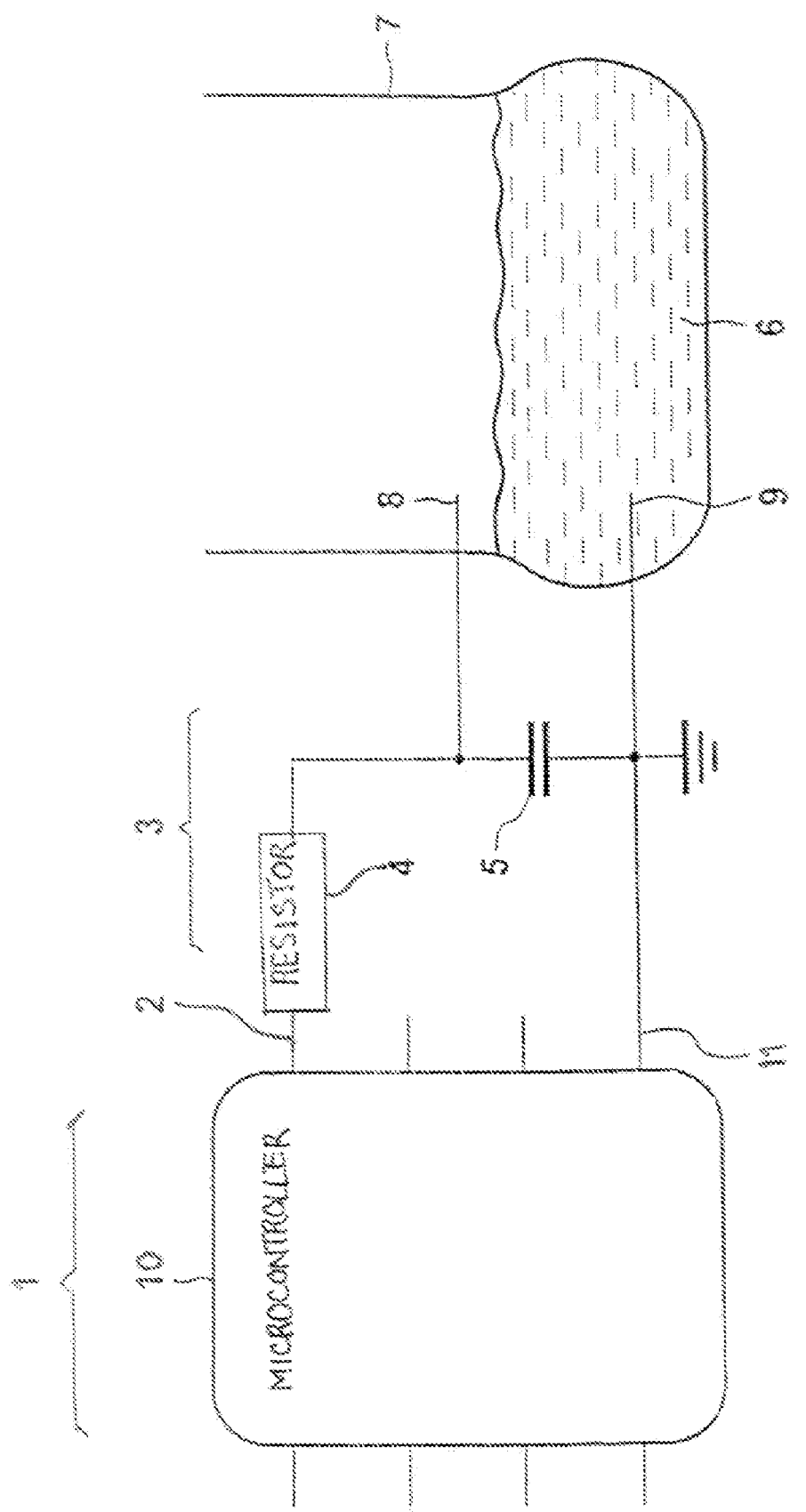
FIG. 1 is a schematic diagram of a container liquid level detector.

The circuit arrangement shown in FIG. 1 includes a measuring circuit 1 provided in a microcontroller 10 and an integrator circuit 3 that includes a resistor 4 and a capacitor 5. Although the microcontroller 10 has multiple terminals, only one of these terminals (i.e., terminal 2, i.e., a first terminal) is provided for the measuring circuit in addition to a ground terminal 11 (i.e., a second terminal). This sole terminal 2 is reversible, i.e., it can be alternately used as an output and an input. The integrator circuit 3 is connected to this terminal 2, i.e., one end of the resistor 4 is connected to the terminal 2 and the other end of the resistor 4 is connected to a level measuring electrode 8 of a liquid container 7 and to the ground via a capacitor 5. The container 7 is also provided with a second electrode 9 that is arranged underneath the level measuring electrode 8 and connected to the ground.

The measuring sequence is described below. First, the measuring circuit 1, provided in the microcontroller 10, delivers a brief voltage pulse at terminal 2 that is switched into the output mode. The intensity of this voltage pulse is chosen such that the capacitor 5 of the integrator circuit 3 can be almost completely charged. The two electrodes 8, 9 of the container 7 lie parallel to the capacitor 5 and also represent a capacitor, the capacitance of which is dependent, however, on whether only the level measuring electrode 8 or both electrodes 8, 9 are immersed in the liquid 6. Next, the terminal 2 of the measuring circuit 1 is reversed during a brief second period and then represents a high-resistance input of the measuring circuit 1. Leaving aside negligible leakage currents, the capacitor 5 of the integrator circuit 3 therefore cannot discharge if only the second electrode 9 or neither electrode is immersed in the liquid 6. This means that the capacitor holds a voltage that approximately corresponds to the amplitude of the voltage pulse received by the capacitor in the first step. However, if both electrodes 8, 9 are immersed in the liquid, the capacitor 5 of the integrator circuit 3 is charged to a comparatively low voltage during the first step because the capacitance of the liquid 6 lies parallel to the capacitor in this arrangement. Furthermore, the capacitor would be able to discharge via the liquid 6 during the second step. Then, the measuring circuit 1 detects or measures the voltage at the capacitor 5 of the integrator circuit 3 during a third period.

The length of the first and the second period and the ratings of the integrator circuit 3 can be chosen such that the measuring circuit 1 merely needs to detect either a HIGH-level or a LOW-level, i.e., the voltage is not precisely measured in the third step, but rather merely detected by the microcontroller 10. This means, in particular, that the resistance of the resistor 4 of the integrator circuit 3 needs to be much higher than the resistance of the liquid 6 between the two electrodes 8, 9, and that the capacitance of the capacitor 5 of the integrator circuit 3 needs to be much lower than the capacitance of the liquid between the two electrodes. The measuring cycle including the steps of applying the predetermined voltage, discontinuing the application of the voltage, and detecting the electrode voltage is preferably not repeated until a fourth period has elapsed after detecting the electrode voltage. The fourth period is generally much longer than the second and third periods.

The invention claimed is:

1. A method of detecting a liquid level of an electrically conductive liquid in a container, comprising:
   providing a capacitor connecting first and second electrodes spaced apart at different levels within the container;
   charging the capacitor by applying a voltage to the capacitor via a first terminal of a measuring circuit for a predetermined first period of time;
   discontinuing the application of the voltage and waiting a predetermined second period of time; and then
   determining whether the capacitor discharged via the liquid during the predetermined second period of time by
   switching the first terminal to an input mode, and
   measuring a voltage across the capacitor via the first terminal.

2. The method according to claim 1, further comprising waiting a predetermined third period of time after measuring the capacitor's voltage, and then repeating the steps of applying the voltage, discontinuing the application of the voltage, and measuring the capacitor's voltage.

3. The method according to claim 1, further comprising connecting the first level measuring electrode to an electric potential following the measuring of the capacitor's voltage, thereby preventing electrolyzing of the liquid.

4. The method according to claim 3, wherein the electric potential is the ground potential.

5. The method according to claim 1, further comprising providing a microcontroller that applies the voltage to the capacitor.

6. The method according to claim 5, further comprising providing a resistor, and applying the voltage to the capacitor via the resistor.

7. A container liquid level detector, comprising:
   a first level measuring electrode disposed within a container at a first liquid level;
   a second level measuring electrode disposed within the container at a second liquid level;
   a capacitor having a first end connected to the first level measuring electrode and a second end connected to the second level measuring electrode;
   a measuring circuit including a first and a second terminal;
   a first electrical connection between the first terminal of the measuring circuit and the first end of the capacitor; and
   a second electrical connection between the second terminal of the measuring circuit and the second end of the capacitor,
   wherein the measuring circuit is configured to switch the first terminal between an output mode for charging the capacitor by applying a voltage to the capacitor and an input mode for measuring the voltage at the capacitor.

8. The container liquid level detector according to claim 7, wherein the measuring circuit comprises a microcontroller, wherein the microcontroller is configured to switch the first terminal between the output mode and the input mode.

9. The container liquid level detector according to claim 8, wherein the microcontroller is configured to apply a voltage to the capacitor when the first terminal is switched in us output mode.

10. The container liquid level detector according to claim 8, wherein the microcontroller is configured to detect a measuring voltage across the capacitor when the first terminal is switched in its input mode.

11. The container liquid level detector according to claim 7, wherein the second level measuring electrode is a ground electrode.

12. The container liquid level detector according to claim 7, further comprising:
   a resistor having a first end connected to the first terminal of the measuring circuit, and a second end connected to the first end of the capacitor.

13. A method of detecting a level of an electrically conductive liquid in a container, comprising:
   providing a container liquid level detector, comprising:
   a first level measuring electrode disposed within the container at a first liquid level,
   a second level measuring electrode disposed within the container at a second liquid level,
   a capacitor having a list end connected to the first level measuring electrode and a second end connected to the second level measuring electrode,
   a measuring circuit including a first terminal, wherein the measuring circuit is configured to switch the first terminal between an output mode and an input mode, and
   a electrical connection between the first terminal of the measuring circuit and the first end of the capacitor;
   charging the capacitor by applying a voltage from the measuring circuit to the capacitor for a predetermined first period of time;
   discontinuing the application of the voltage and waiting a predetermined second period of time; and then
   determining whether the capacitor discharged via the liquid during the predetermined second period of time by detecting a measuring voltage across the capacitor with the measuring circuit after the predetermined second period of time.

14. The method according to claim 13, wherein applying the voltage includes setting the first terminal of the measuring circuit to the output mode and delivering the voltage to the capacitor.

15. The method according to claim 13, wherein detecting the measuring voltage includes switching the first terminal of the measuring circuit to the input mode and detecting a voltage across the capacitor.

16. The method according to claim 13, wherein the measuring circuit comprises:
   a microcontroller, wherein the microcontroller is configured to switch the first terminal between the output mode and the input mode.

17. The method according to claim 13, further comprising:
   a resistor having a first end connected to the first terminal of the measuring circuit, and a second end connected to the first end of the capacitor.

18. The method according to claim 13, further comprising connecting the first level measuring electrode to an electric potential following the measuring of capacitor's voltage, thereby preventing electrolyzing of the liquid.

19. A method of detecting a liquid level of an electrically conductive liquid in a container, comprising:
   providing a capacitor connecting first and second electrodes spaced apart at different levels within the container;

charging the capacitor by applying a voltage to the capacitor for a predetermined first period of time;

discontinuing the application of the voltage and waiting a predetermined second period of time; then determining whether the capacitor discharged via the liquid during the predetermined second period of time by measuring a voltage across the capacitor; and connecting the first level measuring electrode to an electric potential following the measuring of the capacitor's voltage, thereby preventing electrolyzing of the liquid.

20. The method according to claim 19, wherein the electric potential is a ground potential.

* * * * *

UNITED STATES PATENT AND TRADEMARK OFFICE
CERTIFICATE OF CORRECTION

PATENT NO.       : 7,378,857 B2  
APPLICATION NO.  : 10/559006  
DATED            : May 27, 2008  
INVENTOR(S)      : Michael Franke and Frank Wohlrabe Page 1 of 1

It is certified that error appears in the above-identified patent and that said Letters Patent is hereby corrected as shown below:

Column 3, Claim 9, Line 63;  
Delete [us] and Insert --its--

Column 4, Claim 13, Line 18;  
Delete [list] and Insert --first--

Signed and Sealed this

Fifth Day of August, 2008

JON W. DUDAS  
*Director of the United States Patent and Trademark Office*